United States Patent Office 3,440,885
Patented Apr. 29, 1969

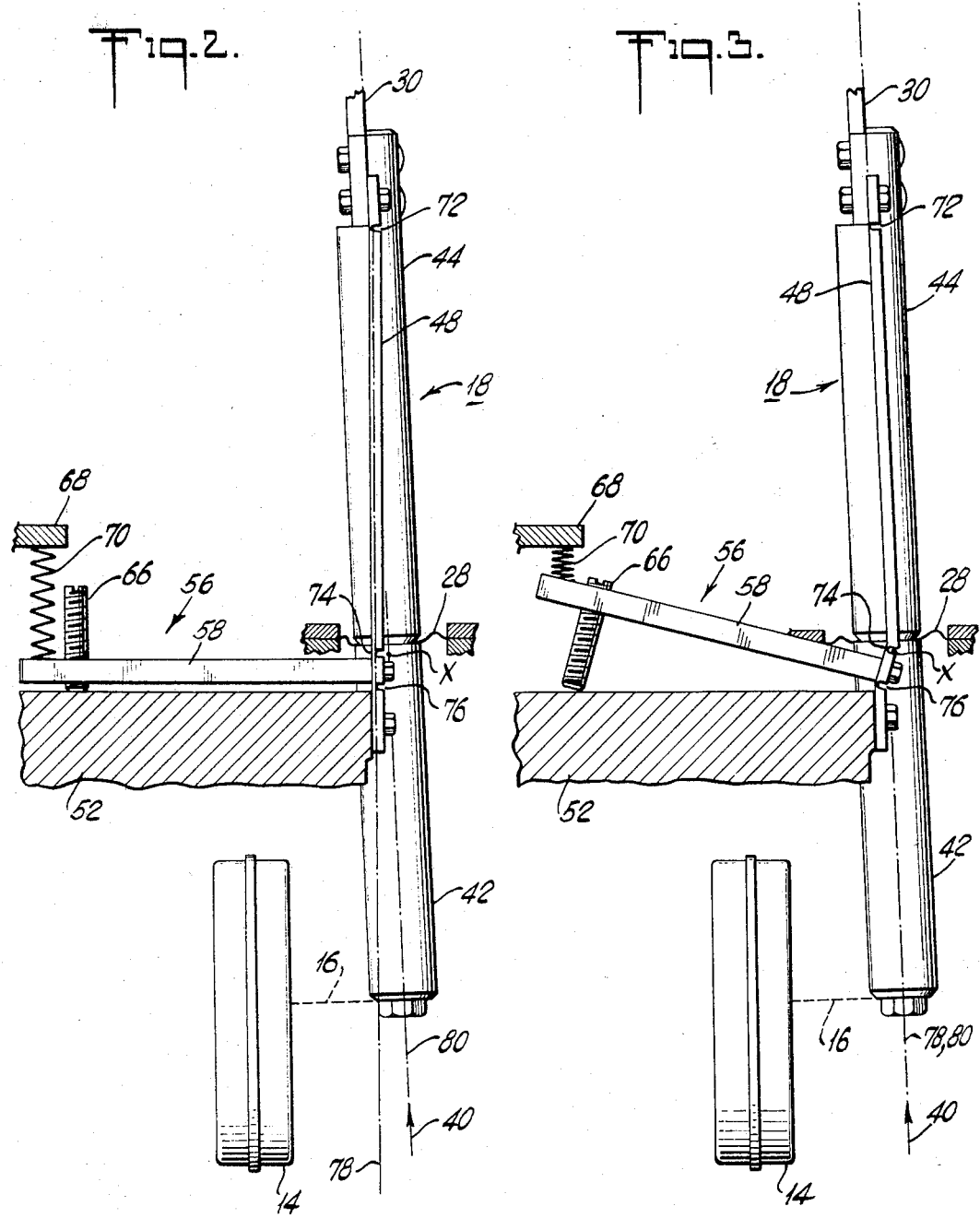

3,440,885
STATIC PRESSURE ALIGNMENT MEANS FOR DIFFERENTIAL PRESSURE MEASURING INSTRUMENT
Robert J. Robinson, Lexington, Mass., assignor to The Foxboro Company, Foxboro, Mass.
Filed Sept. 8, 1967, Ser. No. 666,409
Int. Cl. G01l 7/08
U.S. Cl. 73—407    7 Claims

ABSTRACT OF THE DISCLOSURE

The differential pressure measuring device is of the force-balance type which has a pivotal force-bar secured to flexure struts which carry the longitudinal load due to static pressure within the casing. The alignment means includes a lever secured to the struts between the points at which the struts are secured to the casing and the force-bar. By lifting or lowering the lever, the strut flexures are bent so as to align the effective pivot axis of the flexures with the effective pivot axis of the force-bar. The flexure bending points are defined by transverse lines along which the cross-sectional area of the struts is reduced.

---

This invention relates to differential pressure measuring instruments. More particularly, the present invention relates to means for aligning certain load bearing elements so as to minimize measurement errors due to changes in static pressure of the fluid system to which the instrument is connected.

The present invention comprises an improvement over differential pressure measuring apparatus of the type shown in U.S. Patent 2,806,480 which is used for producing measurement signals which can be transmitted to remote control stations to operate indicating, recording or controlling devices. It particularly is an object of the present invention to provide such a differential pressure measuring instrument with improved accuracy of operation and ease of adjustment. Other objects will be apparent from the following description and drawings.

In the drawings:

FIGURES 2 and 3 are partially schematic side elevation views illustrating the operation of a portion of the structure of FIGURE 1.

Figure 1:
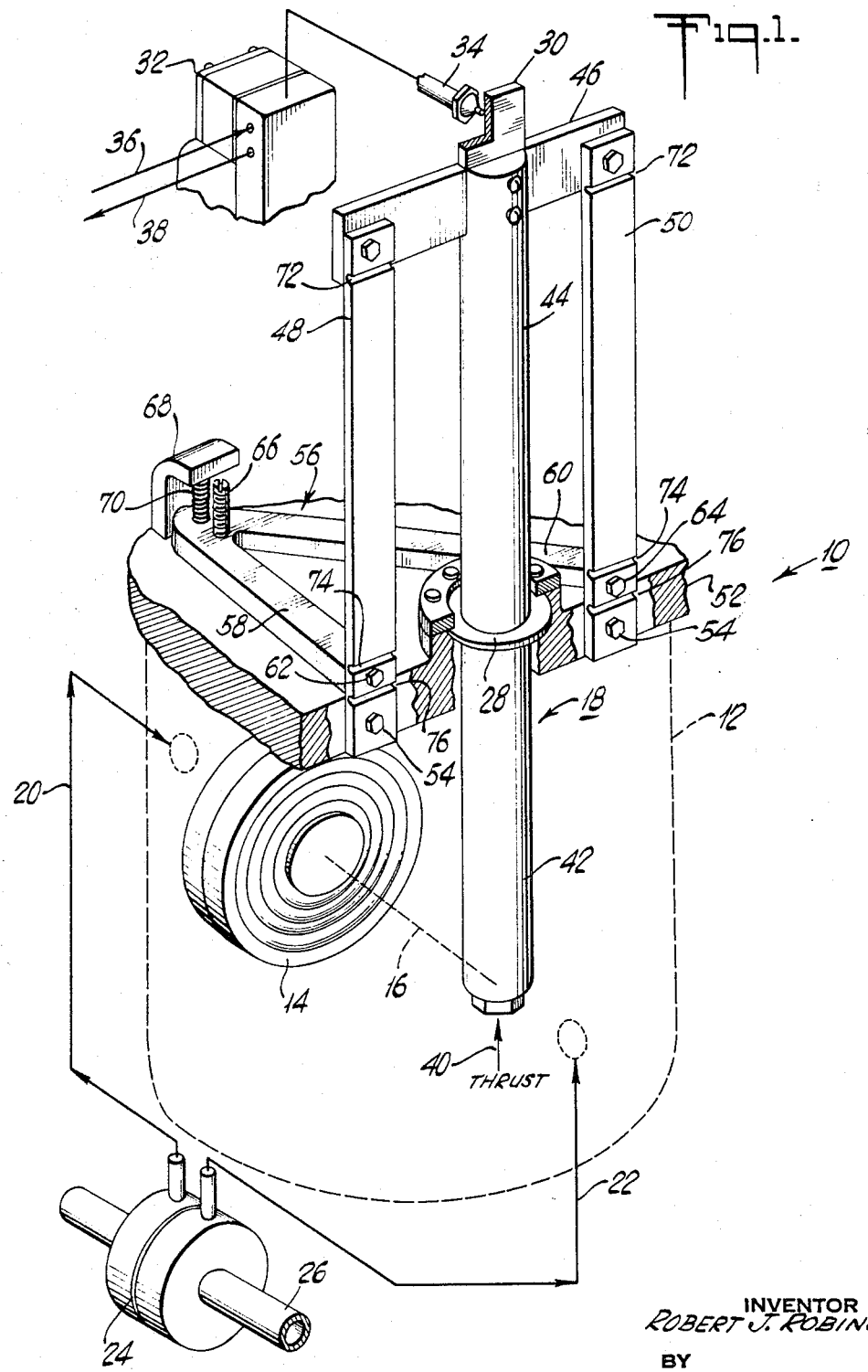
FIGURE 1 is a partially perspective and partially schematic view of a differential pressure responsive device constructed in accordance with the present invention.

FIGURE 1 shows a differential pressure-responsive measuring instrument 10 constructed in accordance with the present invention. Instrument 10 has a pressure-tight casing indicated schematically by dashed outline 12. Within the casing 12 is a presure-responsive diaphragm 14 which is mechanically linked, as is indicated schematically at 16, to the lower end 42 of a balanceable force-bar 18.

Different pressures are received in the casing through lines 20 and 22, and the different pressures are applied to opposite sides of the diaphragm 14. By way of example, the different pressures are shown as being taken from opposite sides of an orifice plate 24 in a pipe 26 through which a liquid is flowing. It is desired to measure the flow-rate of liquid through the pipe, and, as is well known, the difference in pressure appearing across the orifice is representative of the flow rate.

The different pressures on opposite sides of the diaphragm 14 develop a force tending to move the lower end of the force bar 18. The force bar pivots about a resilient seal-out diaphragm 28 which is secured to the top plate 52 of the casing 12. A portion 30 extends upwardly from the upper end 44 of the force bar 18 to serve as a flapper for controlling the flow of air from a nozzle 34 which is connected through a pressure-dropping restrictor to an air supply line 36.

The back-pressure of nozzle 34 is coupled to a pneumatic relay 32 of conventional type such as that described in the above-mentioned Patent 2,806,480. It receives supply pressure from line 36, and delivers a feedback pressure signal corresponding to the nozzle back pressure to a feed back bellows (not shown) arranged to apply a rebalance force to the force bar 18 tending to oppose the input force from the diaphragm 14. This feedback signal also serves as the output signal of the instrument and is directed through an output line 38 to be used in any one of a number of well-known ways to indicate the magnitude of the pressure. Whenever the differential pressure changes, the resulting movement of the force-bar is detected by nozzle 34, and the feedback and output pressures are automatically varied to reestablish the condition of balance of forces on the force-bar. The amount of force-bar movement is extremely small, e.g., less than .001″ at the nozzle 34.

In many uses of the device 10, the pressure inside the casing 12 is relatively high with respect to atmospheric pressure outside the casing; for example, the internal static pressure may be up to 2,000 p.s.i. or more. Therefore, a substantial thrust may be created along the longitudinal axis of the force-bar as is indicated by the arrow 40. Since this thrust tends to push the force-bar out of the casing, a support strut system is provided to hold the force-bar against this thrust. This strut system includes a cross-bar 46 secured to the top of the force-bar 18, and a pair of support struts 48 and 50, each of which is secured at its upper end to one end of the cross-bar 46, and its lower end to the top plate 52 of the casing 12 by means of screws 54.

Under certain circumstances, the longitudinal axis 80 of the force-bar 18 may not be aligned perfectly with the longitudinal axis 78 of the flexures 48 and 50, and the force-bar axis 80 will form an angle with the flexure axis 78, as is shown in FIGURE 2. (This angle usually will be much smaller than is shown in FIGURE 2, but the angle is exaggerated in the drawings for the sake of clarity.) If the various components of the device were allowed to remain with the orientation shown in FIGURE 2, a serious error could develop in the operation of the device. That is, since the downwardly-directed reaction force exerted on the force-bar by the struts 48 and 50 would not be directed along the longitudinal axis of the force-bar, a component of reaction force would be created which would tend to rotate the force-bar about its pivot axis. This, of course, would create an error in the output signal developed by the instrument.

In the past, the foregoing error has been partially eliminated by locating the pivot point at which the flexure is secured to the casing top 52 above the force-bar pivot axis, and then rotating the force-bar until the strut and force-bar axes are aligned. Such a procedure is described in the aforementioned Patent 2,806,480. Although that arrangement relieves the problem significantly, it does have a remaining source of error in that when the force-bar moves during operation of the device, the axis of the flexure and the axis of the force-bar again will become slightly misaligned and an error force will be developed.

The present invention improves upon the prior adjustment scheme by providing an arrangement which insures that the pivot point of the flexure always will be aligned with the pivot axis of the force-bar during operation of the device.

In one illustrative embodiment of the present invention, a yoke-shaped adjustment lever 56 is provided. The lever 56 has two legs 58 and 60. The end of leg 58 is secured to the strut 48 by means of a screw 62, and the end of leg 60 is secured to the strut 50 by means of a screw 64. An adjustment screw 66 is provided to raise and lower the left end of the yoke 56. A compression spring 70 is positioned between this left end and a horizontal portion of a bracket 68 which is secured to the casing top 52. The spring 70 thrusts the left end of the yoke 56 downwardly, thus holding the yoke 56 in the position to which it is adjusted by means of the screw 66.

The struts 48 and 50 have transverse grooves 72 adjacent the points at which they are secured to the crossbar 46, and similar grooves 74 and 76 above and below the ends of the yoke arms 58 and 60. These grooves provide regions of reduced thickness which serve as flexure strips and provide well-defined bending axes for the struts.

The operation of the adjustment means of the present invention now will be described with reference particularly to FIGURES 2 and 3 of the drawings. When the force-bar 18 rotates, it pivots about an axis X. With a theoretically ideal resilient seal-out diaphragm 28, this pivot axis X would be expected to lie in the plane of the diaphragm. With a practical diaphragm, however, the effective pivot axis X may be located slightly below the plane of the diaphragm 28, as shown.

If the pivot axis X is not aligned with the strut axis 74, as in FIGURE 2, the screw 66 is turned to raise the left end of the yoke 56. This causes the struts to bend at both flexure axes 74 and 76 so as to swing the pivot axes 74 into alignment with the pivot axis X (FIGURE 3). Afterwards, during operation of the device, when the force-bar pivots to a new position, the flexure axis 74 of the struts and the force-bar axis X will remain substantially in alignment. Thus, it will be seen that the source of potential error in the previous system is significantly reduced by the present invention.

A further embodiment of the invention is one in which, instead of a yoke 56 with two arms, a single lever connected to only one of the flexures 48 and 50 is provided. The system shown in FIGURES 2 and 3 can be considered to be such an arrangement as well as a side-elevation view of the system shown in FIGURE 1. In such a single-lever arrangement, the single controlled flexure 74 must move twice as far laterally in order to bring the complete pivot axis defined by the flexures 74 of both struts into alignment with the pivot axis X. This reduces the criticality of the adjustment by a factor of two, and in some applications may make possible adjustment to closer tolerances. Such an arrangement would, in effect, permit "fine" adjustment of the device.

The above description of the invention is intended to be illustrative and not limiting. Various changes or modifications in the embodiments described may occur to those skilled in the art and these can be made without departing from the spirit or scope of the invention.

I claim:

1. In a differential pressure-responsive apparatus, in combination, a sealed casing having a resilient diaphragm forming a part of the wall thereof, a force-bar with one portion in said casing and another extending externally of said casing, said force-bar being secured to said diaphragm, differential pressure-responsive means in said casing and connected to the portion of said force-bar therein to pivot it about a force-bar pivot axis located adjacent the plane of said resilient diaphragm in response to variations in the differential pressure to be measured; support strut means secured to said casing and to the external portion of said force-bar to restrain longitudinal movement of said force-bar, said strut means including first and second flexure means, the first flexure means providing a localized bending axis adjacent the point of attachment of said strut means to said casing and the second flexure means providing a localized bending axis approximately in the plane of said force-bar pivot axis; and adjustment means secured to said support strut means and arranged to create bending forces about said first flexure means so as to move said second flexure means into alignment with the pivot axis of said force bar.

2. Apparatus as in claim 1, including two struts, one on each side of said force-bar, and a cross-bar secured to said force-bar and to the upper ends of said struts, said adjustment means comprising a yoke-shaped member with two arms, each secured to one of said struts intermediate said first and second flexure means.

3. Apparatus as in claim 2 including an adjustment screw for providing adjustable separation between said yoke and said casing, and a spring for thrusting said yoke toward said casing.

4. Apparatus as in claim 2 in which each strut has a third flexure means located adjacent the point of attachment of said strut to said cross-bar.

5. In a differential pressure-responsive apparatus, in combination, a sealed casing having a resilient diaphragm forming a part of the wall thereof, a force-bar with one portion in said casing and another extending externally of said casing, said force-bar being secured to said diaphragm, differential pressure-responsive means in said casing and connected to the portion of said force-bar therein to pivot it about a force-bar pivot axis located adjacent the plane of said resilient diaphragm in response to variations in the differential pressure to be measured, and flexure strut means secured to said casing and to the external portion of said force-bar to inhibit longitudinal movement of said force-bar; and adjustment means for bending said strut means along a flexing line intermediate the points of attachment of said strut means to said casing and said force-bar, said flexing line being located so as to be movable into approximate alignment with the pivot axis of said force-bar when said strut means is bent at said flexing line.

6. Apparatus as in claim 5 in which said bending means comprises a lever secured to the strut adjacent said flexing line and having one end movable longitudinally with respect to the strut to bend said strut about said flexing line.

7. Apparatus as in claim 6 in which said lever is secured to said strut at a position closely adjacent the point of attachment of said strut to said casing.

References Cited

UNITED STATES PATENTS

| | | | |
|---|---|---|---|
| 2,806,480 | 9/1957 | Bowditch | 137—85 |
| 3,315,528 | 4/1967 | Hickox | 73—407 |

LOUIS R. PRINCE, *Primary Examiner.*

DONALD O. WOODIEL, *Assistant Examiner.*